(12) United States Patent
Cho

(10) Patent No.: US 12,020,106 B1
(45) Date of Patent: Jun. 25, 2024

(54) MUSIC VIDEO PLAYBACK DEVICE HAVING HARDWARE-BASED ANTI-PIRACY FUNCTION

(71) Applicant: DODRONE COMPANY, Incheon (KR)

(72) Inventor: Kuen Hee Cho, Incheon (KR)

(73) Assignee: DODRONE COMPANY, Incheon (KR)

( * ) Notice: Subject to any disclaimer, the term of this patent is extended or adjusted under 35 U.S.C. 154(b) by 0 days.

(21) Appl. No.: 18/324,604

(22) Filed: May 26, 2023

(51) Int. Cl.
*G06K 7/00* (2006.01)

(52) U.S. Cl.
CPC ......... *G06K 7/0021* (2013.01); *G06K 7/0008* (2013.01); *G06K 7/006* (2013.01)

(58) Field of Classification Search
CPC ..... G06K 7/0021; G06K 7/0008; G06K 7/006

USPC .......................................................... 235/441
See application file for complete search history.

*Primary Examiner* — Daniel A Hess
(74) *Attorney, Agent, or Firm* — Knobbe, MartenS, Olson & Bear, LLP

(57) ABSTRACT

A music video playback device comprises a music video album card having a memory in which music video files are stored and a music video player for receiving and playing the music video files from the music video album card. In addition, the music video album card includes a specific contact pad array card pattern, and the music video player includes a display, a speaker, video file reproducing means, audio file reproducing means, a battery, and means for connecting the music video album card. In addition, the music video album card connecting means includes a specific contact pad connector pattern corresponding to the specific contact pad array card pattern. Since the music video playback device can provide protection from illegal copying, it can be new video media capable of issuing specific music video albums for specific singers or limited editions of portable movie films.

5 Claims, 4 Drawing Sheets

Book Type     Calendar Type     Box Type

MUSIC VIDEO PLAYBACK DEVICE HAVING HARDWARE-BASED ANTI-PIRACY FUNCTION

TECHNICAL FIELD

The present disclosure is related to a Music video playback device having hardware-based anti-piracy means. More specifically, the present disclosure is related to a Music video playback device having a pattern of electric contact pad for anti-piracy.

BACKGROUND

Album market can be classified into two categories, CD market and DVD market. Audio data are stored in CD, audio and video data are stored in DVD. There was a time that audio playback device (such as CD player or record player) and video playback device (such as DVD player) were necessaries of life. Today, Smart phones and smart pads have replaced those necessaries of life, such as CD player and DVD player.

SUMMARY

An aspect of the present disclosure is to provide a new music video playback device that can be manufactured at low cost, and can play back immediately stored music videos by applying video catalog technology.

The video playback device to be provided by the present disclosure is equipped with a 7-inch or larger display (such as LCD, OLED) that exceeds the screen of a small smartphone, and a user can enjoy a music video album of a singer without connecting to a separate playback device (including smartphone).

An image of a specific singer or a character of an album production company can be printed on the paper case of the music video playback device to be provided by the present disclosure as if a video catalog. Accordingly, a singer or album production company printed on the case of the music video playback device would not want a music video album produced by another singer or album production company to be played.

The music video playback device according to the present disclosure needs to have a function of playing only music video albums of a specific singer or a specific album production company. That is, an aspect of the present disclosure is to provide a closed type music video playback device capable of playing only music video albums of a specific singer (or album production company).

In order to apply video catalog technology to a music video playback device for playing a music video album, the followings may need to be considered.

First, a music video playback device may need to have means capable of preventing illegal copying of the album. Since video catalogs for promoting products are common in China and can be produced by many companies, it is difficult to prevent illegal copying when a method of downloading videos to the internal memory of a music video playback device is applied.

Second, a singer who has released a music video playback device printed with his/her image may not want another singer's music video to be played on the music video playback device printed with his/her image. That is, a music video playback device printed with an image of a specific singer needs to play only music video albums of the specific singer. In addition, even if a music video album of the specific singer is illegally copied, it may be necessary that the copied music video album can not played without the music video playback device on which the image of the specific singer is printed.

Third, even if a music video playback device printed with a specific singer's image is duplicated, it may be necessary to configure the music video playback device not to play back a music video album if it does not match with the specific singer's music video album.

A new music video playback device according to the present disclosure to provide a device having a hardware-based anti-piracy means.

The music video playback device of the present disclosure comprises a music video album card having a memory in which music video files are stored and a music video player for receiving and playing the music video files from the music video album card.

In addition, the music video album card includes a specific contact pad array card pattern, and the music video player includes a display, a speaker, video file reproducing or player means, audio file reproducing or player means, a battery, and connector means for connecting the music video album card. In addition, the music video album card connector means includes a specific contact pad connector pattern corresponding to the specific contact pad array card pattern.

In some embodiments, the specific contact pad array card pattern of the music video playback device could be a predetermined contact pad array card pattern for a producer of the music video files. Also, the specific contact pad array card pattern of the music video playback device could be a predetermined contact pad array card pattern for a creator of the music video files.

In some embodiments, the music video album card connecting means of the music video player can be configured to supply battery power to the music video player when a music video album card having a specific contact pad array card pattern corresponding to a specific contact pad connector pattern is inserted.

In some embodiments, when power is supplied to the music video player, the memory of the music video album card includes a video folder in which video files are stored and an audio folder in which audio files are stored, and the video file reproducing means is configured to play files in the video folder on a display, and the audio file reproducing means is configured to play files in the audio folder through a speaker.

According to the present disclosure, the music video album card with memory can be produced by enlarging a Standard Micro SD Memory Card (size 11 mm×14 mm) to a credit card size (size 54 mm×85 mm) memory card. Contact points (for example 8 pins) of the Standard Micro Memory Card for data input/output can be arranged in the shape of a contact pad array pattern at specific locations on the music video album card.

When changing the position of the contact pad array pattern on a music video album card, much more specific contact pad array patterns can be generated. For example, when combining the change of the contact pad array pattern (pattern map) with the change of the position of the contact pad array pattern, much more specific contact pad array patterns can be configured.

A music video album card having a specific contact pad array pattern and a specific placement position of the array pattern can be assigned to a specific singer (or a music video album of the specific singer, or a music video album producer).

According to the present disclosure, the music video player can also be assigned to a specific singer (or a music video album of the specific singer, or a music video album producer). The music video album card contact pattern of the video player can be configured to have the same pattern as the pattern of the music video album card assigned to a specific singer (or a music video album of a specific singer, or a music video album producer). By configurating the music video player to have a specific video card contact pattern of a specific singer, the music video player can be assigned to a specific singer.

If a user who has purchased the music video playback device of a specific singer additionally purchases a music video album card of the same singer, he can enjoy the additional music video albums card without purchasing additional music video player having a display.

Music video files played in the music video playback device of the present disclosure is not limited to a singer's music video files, Music video files played in the music video playback device of the present disclosure can include various types of video files that can be played such as an oral story telling with animations, movies, educational lectures, etc.

The music video playback device of the present disclosure can be manufactured cheaply, so it can be used as a new type of music video album consisting of a video player and a music video album card as a set.

The music video album of the present disclosure is composed of a set of a video player and a music video album card which is configured to be inserted into the video player, therefore a user can enjoy music videos immediately by inserting a music video card into a video player without having to connect to a separate video player or display device.

Also, by assigning a music video album having a specific contact pad array pattern to a specific singer, it is possible to prevent illegal copying of the music playback device on a hard-wear base. Accordingly, it is possible to release limited edition music video albums of a specific singer with high collectible value by preventing illegal copying.

DETAILED DESCRIPTION OF EMBODIMENTS

Figure 1:
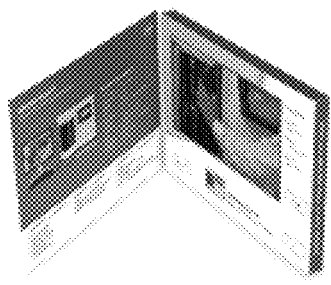
FIG. 1 is photo images of various video catalogs currently on sale.
Figure 1:
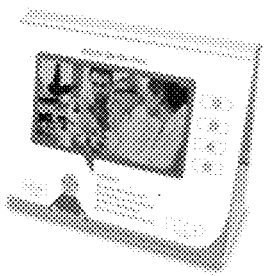
Figure 1:
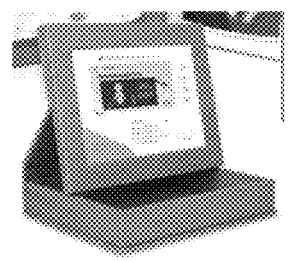

Terms or words used in this specification and claims should not be construed as being limited to ordinary or dictionary meanings. Based on the principle that the inventor can appropriately define the concept of the terms and wards in order to explain his or her disclosure in the best way, terms and wards should be interpreted as meaning and concept consistent with the technical spirit of the present disclosure. The embodiments described in this specification and the configurations shown in the drawings are only examples of the present disclosure, Therefore, it should be understood that there may be various equivalents and modified embodiments that can replace the illustrated embodiments at the time of this application.

Hereinafter, embodiments of the present disclosure will be described in detail with reference to the accompanying drawings.

Meanwhile, video catalogs as shown in FIG. 1 have been developed and sold in the market. The video catalogs are products equipped with a display to show a video about products in addition to paper catalogs having product descriptions.

Since the video catalog case is made of paper, detailed printing with various designs is possible according to the request of an order, and at the same time it can be manufactured very lightly and thinly while being equipped with a display, a battery, memory, function keys, a speaker, and USB connector. The video catalogs use a technology to read video data stored in a video chip and play it on the display, and since power consumption is optimized during video playback, can play videos for more than 4 hours. The capacity of the internal flash memory (NAND) for storing video files can be selected from 128 MB to 8 GB, and video data can be downloaded to the internal flash memory through a USB port.

Video catalogs are more expensive than paper catalogs, but have the advantage of being relatively inexpensive when catalogs of products requiring video explanations are separately needed. Video catalogs are gradually expanding their application fields; such as calendars and albums, by combining the advantages of paper catalogs with the advantage of low price when video product descriptions are needed. The supply price of the video catalog starts at around 10 USD, and various types of monitors are sold in sizes ranging from 4 inches to 10 inches.

If the technology applied to the video catalog having various advantages as described above is applied to the music video album, it is possible to provide a music video album that is inexpensive, beautifully printed with various designs, and can be played back immediately.

However, in case of a video catalog for the purpose of product promotion, anyone is encouraged to copy and use, but in case of a music video album, a means to prevent illegal copying is absolutely necessary.

FIG. 1 is photo images of various video catalogs currently on sale. Video catalogs are designed to promote products with visuals rather than text by mounting a monitor in addition to thick paper promotional material. Video catalogs take advantage of the paper catalogs and videos, and their application fields are gradually expanding.

Video catalogs can be supplied from the beginning of 10 USD, and monitor sizes of video catalogs range from 4 inches to 10 inches. In the video catalog, the product case material is made of paper, so specific designs and detailed printing are possible according to the orderer's specifications. In addition, the video catalog can be made very light and thin, although it includes a monitor, a battery, a video chip, a memory, function keys, a speaker, and a USB connector.

The video catalog also has a video chip that reads video data from the internal memory and plays it on the display. By optimizing power consumption during video playback, the video catalog is possible to play for more than 4 hours. The internal memory (NAND) capacity of the video catalog can be selected from 128 MB to 8 GB, video data can be downloaded to the internal memory through the USB port. Video catalogs are produced and sold in various forms such as booklet type, desk calendar type, storage box type, and album type. In addition, the video catalog has a magnetic switch installed on the cover so that the power is turned off when the cover is closed and the power is turned on when the cover is opened.

Figure 2:
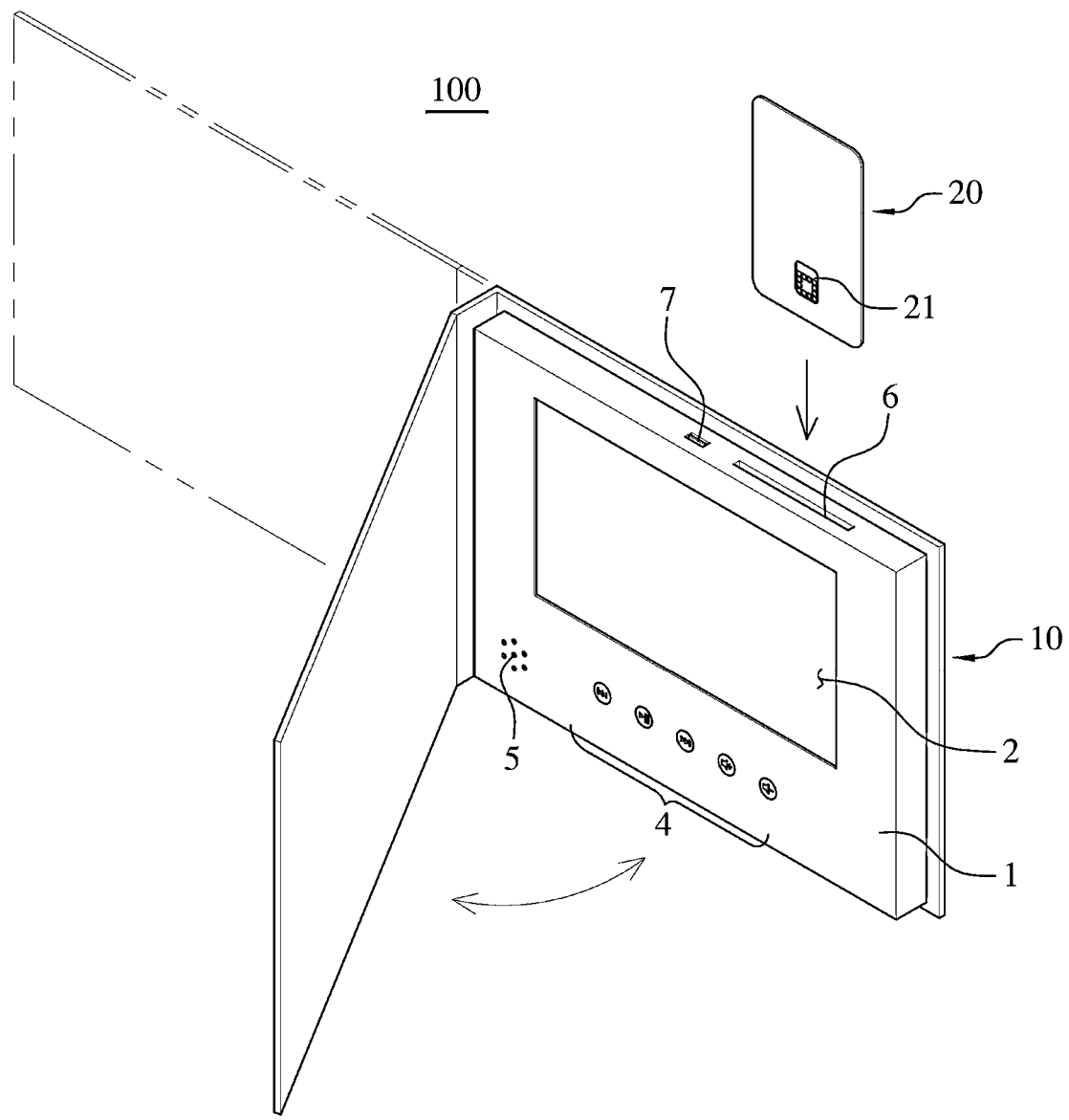
FIG. 2 is a perspective view of an embodiment of a music video playback device according to the present disclosure.

FIG. 2 is a perspective view of an embodiment of a music video playback device according to the present disclosure. Referring to FIG. 2, a music video playback device 100 having a hardware-based anti-piracy function includes a music video album card having a memory in which music video files are stored, and a music video player for receiving and playing stored music video files from the music video album card.

Video catalogs may be vulnerable to illegal copying because they are designed to download video data to an internal memory through a USB port. To address the foregoing, a music video album card 20 having a pattern and detachable from a video player is provided to prevent illegal copying.

Figure 3:
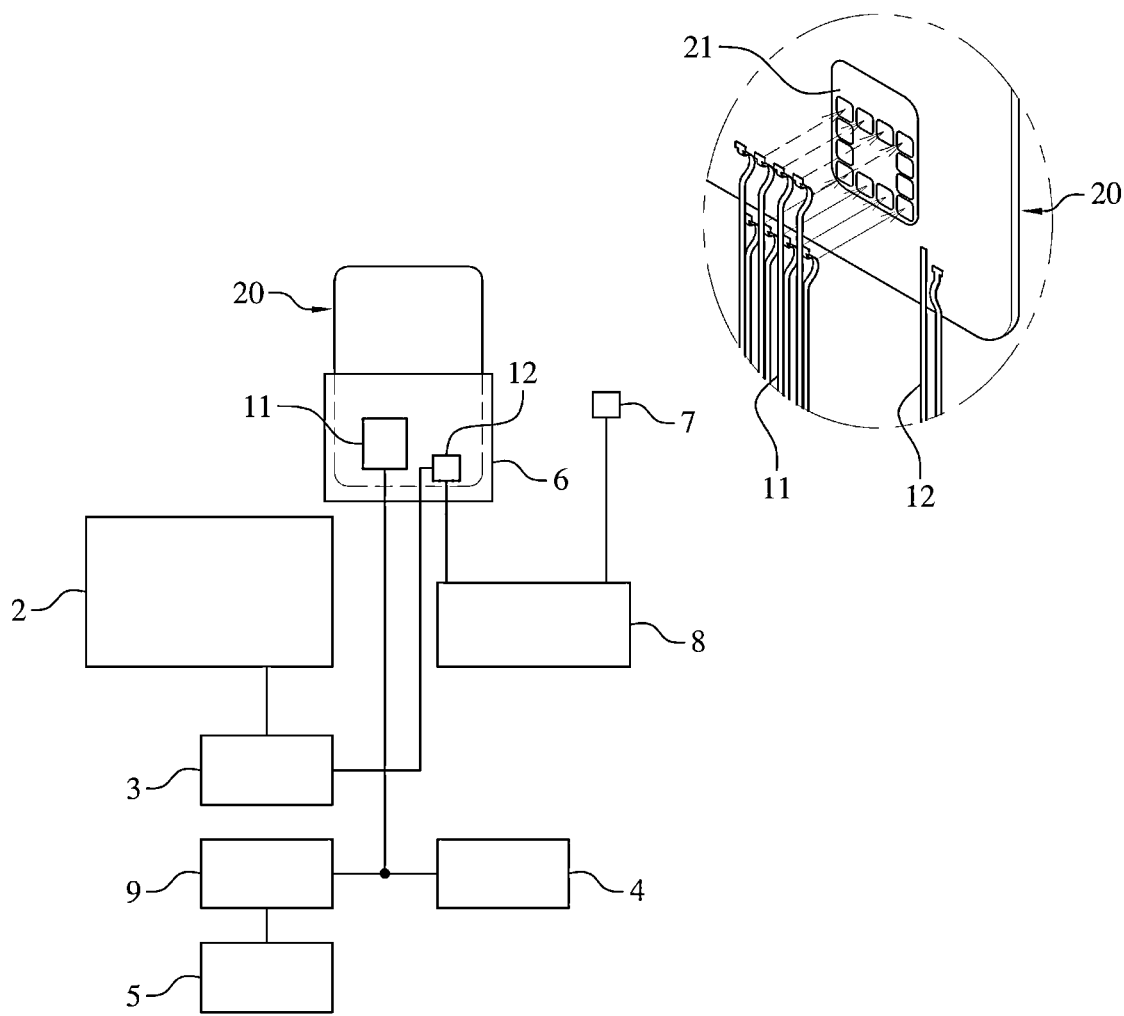
FIG. 3 is a hardware block diagram of the music video playback device of the embodiment shown in FIG. 2.

FIG. 3 is a hardware block diagram of the music video playback device of the embodiment shown in FIG. 2. The music video player 10 includes a case 1 made of paper on which a specific music video image is printed, a screen display device 2 (or display) installed in the case 1, a speaker 5, control keys 4, a battery 8, a battery charging terminal 7, video playback chip 3 (or video file playback means), and audio file playback means 9.

In addition, the music video album card 20 has a specific contact pad array card pattern 21 for transmitting music video files stored in the memory. The specific contact pad array card pattern 21 can be configured to have a different pattern and can be located at a different position on the card for a specific singer (or a specific music video producer) who made the music video. In addition, the music video player has a music video album card connecting means 6 for detachably receiving the music video album card 20. The contact pad connector 11 has a specific contact pad connector pattern corresponding to the specific contact pad array card pattern 21 of the music video album card 20 to be inserted.

Figure 4:
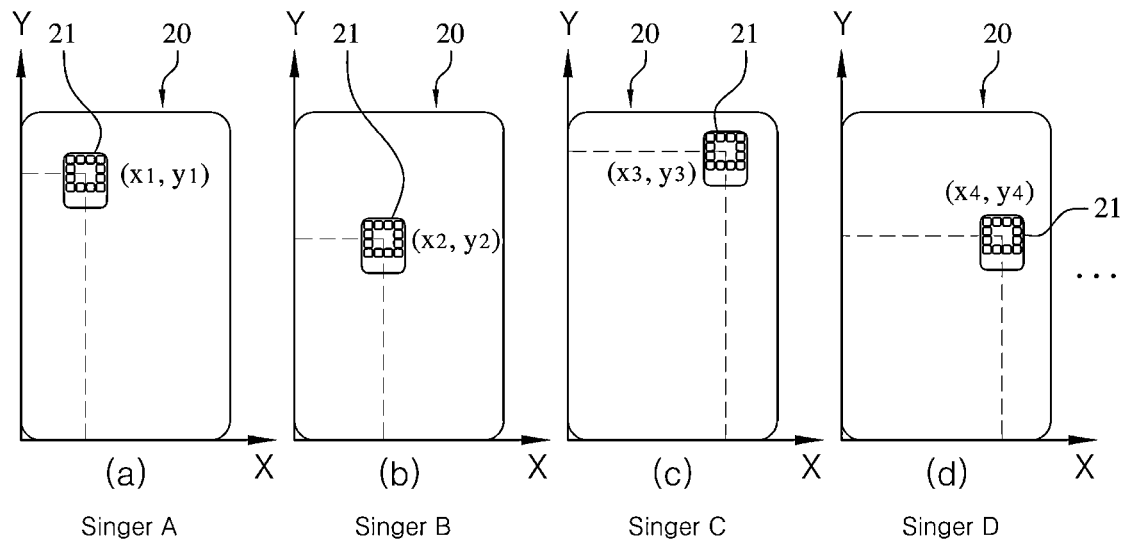
FIG. 4 shows explanatory diagrams of music video album cards having different placement positions of a contact pad array pattern.

FIG. 4 shows explanatory diagrams of music video album cards having different placement positions of a contact pad array pattern. As shown in (a)-(d) of FIG. 4, by changing the position where the contact pad array card pattern 21 is disposed on the card 20 (for example, x, y coordinates of the center of the card pattern from the lower left of the card) for each singer (or producer), it is possible to provide the music video album card 20 with the function of copy protection. In one embodiment of the present disclosure, the position of the contact pad array pattern 21 is configured differently for each specific singer who made the music video. Namely, the music video album card containing music video files can be a specific music video album card dedicated to a specific singer by configuring the positions of the input/output contact pad array pattern 21 differently.

Other music video album cards of the same singer can be configured to be used interchangeably with video players assigned to the same singer. In addition, typical DVD players are open types capable of playing all the DVDs produced according to standard specifications, but the music video playback device of the present disclosure may be configured to a closed type capable of playing only a music video album of a specific singer. Since the music video playback device of the present disclosure could have an image of a specific singer printed on the case, if it is configured to play only the music video album card of a specific singer, copying of the music video album can be prevented and the value of the possession of the music video album can be increased.

For example, the position of the contact pad array pattern 21 on the music video album card 20 of the size of a credit card (54 mm×86 mm) can be configured differently at intervals of 2.54 mm in the vertical and horizontal directions. In this case, the contact pad array pattern 21 can be arranged in 15×30=450 different positions.

The music video album cards 20 shown in (a)-(d) of FIG. 4 all use the same contact pad array pattern 21, but it is possible to provide a specific music video album card 20 to a singer by making the position where the contact pad array pattern 21 is arranged different from each other. For example, the contact pad array pattern 21 of singer A may be disposed at a position (x1, y1), and the contact pad array pattern 21 of singer B may be disposed at a position (x2, y2).

Figure 5:
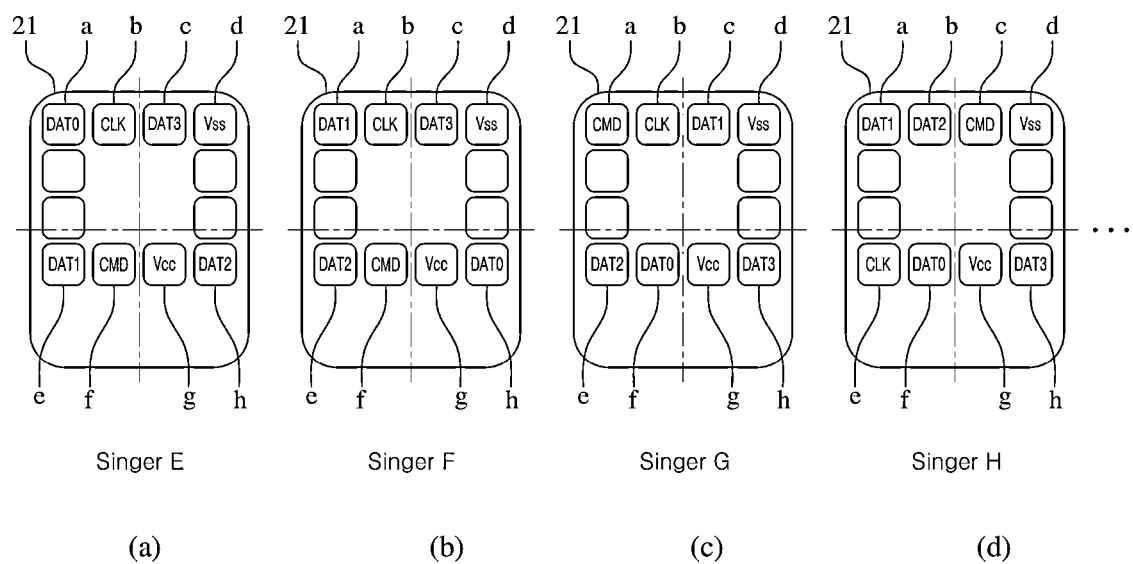
FIG. 5 shows explanatory diagrams of music video album cards having different contact pad array patterns.

FIG. 5 shows explanatory diagrams of music video album cards having different contact pad array patterns. As shown in (a)-(d) of FIG. 5, in the music video album card of this embodiment, the function of preventing illegal copying can be strengthened by configuring the contact pad array pattern map of the contact pad array pattern 21 differently.

The music video album card 20 exchanges signals with the video playback chip 3 through the contact pads of the contact pad array (8 pins-12 pins). As shown in (a)-(d) of FIG. 5, the arrangement of the contact pads of the contact pad array pattern 21 can be configured differently, and a specific singer (or producer) can be assigned to a music video album card 20 having a specific arrangement of contact pads.

When the Micro SD Card Standard is applied to the contact pad of the music video album card 20, eight contact pads (Vcc, Vss, CMD, CLK, DAT0, DAT1, DAT2, DAT3) are required. The pad arrangement of the Standard Micro SD card is in the order of DAT2, DAT3, CMD, Vcc, CLK, Vss, DAT0, DAT1. Therefore, the contact pad array pattern 21 can have 256 patterns when using 8 contact pads (pads a, b, c, d, e, f, g, h in (a) of FIG. 5), and the contact pad array pattern 21 can have 4,096 patterns when using 12 contact pads.

Each of the contact pad array patterns 21 shown in (a)-(d) of FIG. 5 is a contact pad array pattern 21 disposed at the same position of the music video album card 20. In this case, the map of the contact pad array pattern 21 may be configured differently to provide a specific music video album card 20 to a singer. The map of contact pad array pattern 21 shown in (a) of FIG. 5 is assigned as a=DAT0, b=CLK, c=DAT3, d=Vss, e=DAT1, f=CMD, g=Vcc, and h=DAT2, and the map of contact pad array pattern 21 shown in (b) of FIG. 5 is assigned as a=DAT1, b=CLK, c=DAT3, d=Vss, e=DAT2, f=CMD, g=Vcc, and g=DAT0.

Combining the number of cases of the contact pad array pattern 21 (4,096 patterns) with the number of cases (450 positions), where the number of cases is the number of positions of the contact pad array pattern 21 can be located as shown in FIG. 4, the total number of 1,843,200 specific contact pad array patterns (contact pad array pattern positions+contact pad array patterns) can be provided. The total number of cases of different contact pad array patterns 21 may be sufficient to allocate unique contact pad array patterns 21 to singers and/or producers releasing music videos worldwide.

In one embodiment of the present disclosure, in order to reduce power consumption when the music video album card 20 is not inserted into the music video player 10, the battery power connection connector 12 of the music video album card connection means 6 can be configured to be in an off state. When the music video album card 20 is inserted into the music video album card connection means 6, the battery power connector 12 is configured to be turned on, and the music video player can be configured to supply the power of the battery 8 to the video playback chip 3.

In some embodiments, the music video album card connection means 6 of the music video player10 can be configured to supply power from the battery 8 to the music video player10, when the specific contact pad array card pattern 21 corresponding to the specific contact pad connector pattern 11 is inserted.

In the past, an audio playback device called a record player and a video playback device used by connecting it to a TV have been widely used. The audio playback device used a medium called a CD, and the video playback device used a medium called a DVD. Due to differences in standard formats, CD and DVD could not be unified.

The music video album card 20 of the present disclosure can be configured to be commonly used in an audio playback device and a video playback device. A video folder (for example, '/video') for storing video files and an audio folder (for example, '/audio') for storing audio files may be configured in the memory of the music video album card 20, respectively.

Further, the video file playback means 3 of the music video player10 can be configured to play only the files in the video folder, and the audio file playback means 9 of the music video player10 can be configured to play only the files in the audio folder.

The music video playback device of the present disclosure is provided in the form of including a music video player including a display, a speaker, and a battery, and a music video album card having a memory in which moving pictures are stored. Users insert the music video album card into the music video player, and immediately can enjoy the music video on a screen wider than that of a smartphone without connecting the device to the network. Since the music video playback device of the present disclosure can be supplied at a low price and have some advantages of protecting illegal copying, it can be new video media capable of issuing specific music video albums for specific singers or limited editions of portable movie films.

In embodiments, a music video playback device having hardware-based anti-piracy function comprises a music video album card having a memory in which music video files are stored; a music video player that is configured to receive and play the one or more music video files from the music video album card. The music video player includes a display, a speaker, video file player, audio file player, a battery, and a music video album card connector. The music video album card includes a unique contact pad array pattern, and the music video album card connector includes a contact pad connector pattern corresponding to the unique contact pad array pattern.

In embodiments, the music video playback device may be dedicated for playing one or more music video album cards of a first singer among a plurality of singers. Multiple music video album cards of the first singer may store different music videos of the first singer, respectively. The multiple music video album cards of the first singer may have the same contact pad array pattern which is specific or unique to the first singer so that the music video playback device for the first singer can play the music video album cards of the first singer.

In embodiments, a music video album card of a second singer among the plurality of singers includes a contact pad array pattern different from that of the music video album card of the first singer. Thus, in one embodiment, the music video playback device for the first singer cannot play the music video album card of the second singer which can be played in a music video playback device dedicated to the second singer.

In embodiments, the music video playback device may be dedicated for playing one or more music video album cards of a first producer (or a first creator) among a plurality of producers (or creators). Multiple music video album cards of the first producer (or the first creator) may store different music videos of the first producer (or the first creator), respectively. The multiple music video album cards of the first producer (or the first creator) may have the same contact pad array pattern which is specific or unique to the first producer (or the first creator) so that the music video playback device for the first producer (or the first creator) can play the music video album cards of the first producer (or the first creator).

In embodiments, a music video album card of a second producer (or a second creator) among the plurality of producers (or creators) includes a contact pad array pattern different from that of the music video album card of the first producer (or the first creator). Thus, in one embodiment, the music video playback device for the first producer (or the first creator) cannot play the music video album card of the second producer (or the second creator) which can be played in a music video playback device dedicated to the second producer (or the second creator).

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Although the disclosure hereof is detailed and exact to enable those skilled in the art to practice embodiments of the invention, the embodiments disclosed herein are merely examples of the disclosure, which may be embodied in other specific structure and/or configuration. While various embodiments have been described, the details may be changed without departing from the disclosure, which is defined by the claims.

What is claimed is:

1. A music video playback device having hardware-based anti-piracy function comprising:
   a music video album card having a memory in which one or more music video files are stored;
   a music video player for receiving and playing the one or more music video files from the music video album card;
   wherein the music video album card includes a specific contact pad array card pattern;
   wherein the music video player includes a display, a speaker, a video file player, an audio file player, a battery, and a music video album card connector configured to connect the music video album card;
   wherein the music video album card connector includes a specific contact pad connector pattern corresponding to the specific contact pad array card pattern.

2. The music video playback device of claim 1,
wherein the specific contact pad array card pattern is a predetermined contact pad array card pattern for a producer of the music video files.

3. The music video playback device of claim 1,
wherein the specific contact pad array card pattern is a predetermined contact pad array card pattern for a creator of the music video files.

4. The music video playback device of claim 1,
wherein the music video album card connector is configured to supply battery power to the music video player when a music video album card having a specific contact pad array card pattern corresponding to a specific contact pad connector pattern is inserted.

5. The music video playback device of claim 1,
wherein the memory of the music video album card includes a video folder in which video files are stored and an audio folder in which audio files are stored, and
wherein the video file player is configured to play files in the video folder on a display, and the audio file player is configured to play files in the audio folder through a speaker, when power is supplied to the music video player.

\* \* \* \* \*